United States Patent [19]
Lang et al.

[11] Patent Number: 5,482,316
[45] Date of Patent: Jan. 9, 1996

[54] AIR BAG INFLATORS HAVING HOUSINGS WITH CRIMP-FORMED JOINTS

[75] Inventors: Gregory J. Lang, South Ogden; Todd S. Parker, Centerville; Brian H. Fulmer, Farr West; David P. Kosoff; Harry W. Miller, II, both of Ogden, all of Utah

[73] Assignee: Morton International, Inc., Chicago, Ill.

[21] Appl. No.: 330,333

[22] Filed: Oct. 27, 1994

[51] Int. Cl.$^6$ ................................................. B60R 21/26
[52] U.S. Cl. .................... 280/741; 422/166; 102/531
[58] Field of Search .............................. 280/736, 741, 280/742; 422/164, 165, 166; 102/530, 531

[56] References Cited

U.S. PATENT DOCUMENTS

| | | | |
|---|---|---|---|
| 3,985,076 | 10/1976 | Schneiter et al. | 280/741 |
| 4,116,466 | 9/1978 | Gehrig | 280/736 |
| 4,131,299 | 12/1978 | Ono et al. | 280/736 |
| 4,370,930 | 2/1983 | Strasser et al. | 280/741 |
| 4,530,516 | 7/1985 | Adams et al. | 280/741 |
| 4,547,342 | 10/1985 | Adams et al. | 280/741 |
| 4,561,675 | 12/1985 | Adams et al. | 280/741 |
| 4,711,466 | 12/1987 | Breed | 280/741 |
| 4,734,265 | 3/1988 | Nilsson et al. | 280/736 |
| 4,902,036 | 2/1990 | Zander et al. | 280/736 |
| 4,907,819 | 3/1990 | Cuevas | 280/736 |
| 4,923,212 | 5/1990 | Cuevas | 280/736 |
| 5,000,479 | 3/1991 | Werner et al. | 280/736 |
| 5,062,367 | 11/1991 | Hayashi et al. | 280/741 |
| 5,139,280 | 8/1992 | Cord et al. | 280/741 |
| 5,199,740 | 4/1993 | Frantom et al. | 280/736 |
| 5,260,038 | 11/1993 | Decker et al. | 280/736 |
| 5,275,431 | 1/1994 | Stephens | 280/741 |
| 5,306,041 | 4/1994 | Ogawa et al. | 280/741 |
| 5,340,150 | 8/1994 | Harada et al. | 280/741 |
| 5,387,007 | 2/1995 | Ogawa et al. | 280/736 |
| 5,398,967 | 3/1995 | Carothers et al. | 280/741 |

FOREIGN PATENT DOCUMENTS

| | | | |
|---|---|---|---|
| 4317727 | 12/1993 | Germany | 280/736 |
| 2022194 | 12/1979 | United Kingdom | 280/742 |

*Primary Examiner*—Margaret A. Focarino
*Assistant Examiner*—Peter C. English
*Attorney, Agent, or Firm*—Philip C. Peterson; Gerald K. White

[57] ABSTRACT

An air bag inflator including a housing formed of sheet metal includes an annular base having a central opening and a cover for containing gas generating pyrotechnic material including an annular top wall spaced from the base having a central opening in coaxial alignment with the central opening of the base and a cylindrical, ported, outer side wall integrally formed around a periphery of the top wall extending downwardly thereof and having a lower edge secured to a portion of the base outwardly of the central opening. The housing includes a hollow, igniter-containing, rivet having an upper end wall closing over the central opening of the top wall and having a tubular, ported, side wall integrally formed with the upper end wall thereof extending downwardly through the central openings of the base and the top wall. The tubular side wall has a lower end portion of reduced wall thickness extending below an upper surface of the base around the central opening therein forming an outer, annular shoulder for supportively engaging the base when the lower end portion is deformed radially outwardly to engage an underside of the base. A crimp-formed joint, a weld and/or a press-fitted joint may be provided between an outer perimeter portion of the base and a lower end portion of the outer side wall.

35 Claims, 6 Drawing Sheets

AIR BAG INFLATORS HAVING HOUSINGS WITH CRIMP-FORMED JOINTS

BACKGROUND OF THE INVENTION

1. Field of the Invention

The present invention relates to air bag inflators and more particularly air bag inflators having a housing or canister with crimp-formed joints. The air bag inflator having a unique housing or canister construction in accordance with the present invention employs crimped-formed joints formed between a base and inner and outer side walls to provide a low cost sealed enclosure for containing an ignition system, a gas generant and a filter.

2. Background of the Prior Art

U.S. Pat. No. 4,116,466 discloses an air bag inflator employing a threaded connecting joint between a pair of opposite housing sections. U.S. Pat. No. 4,131,299 discloses a gas generator utilizing a housing having a threaded interconnection between opposite housing wall portions and a threaded closure cap for a central ignition chamber. U.S. Pat. No. 4,370,930 discloses an end cap for a propellent container which has a rolled, crimped-edge for joining the cap to the end of a hollow canister. U.S. Pat. No. 4,530,516 discloses a reduced-weight, air bag inflator housing, having a hollow steel center ring member and a separate retaining ring for holding the stamping formed pressure containment components in place. U.S. Pat. No. 4,734,265 discloses a gas generator for safety belt tightening equipment wherein an ignition plug is held in place by a crimped or press fitted section of a housing wall section. U.S. Pat. No. 5,139,280 discloses a cold-gas, pyrotechnic generator including a cover and base that are friction welded together. U.S. Pat. No. 5,275,431 discloses an air bag inflator assembly wherein a support plate is provided with a retainer crimped to a component of an inflator canister for securing the inflator canister in place.

OBJECTS OF THE INVENTION

It is an object of the present invention to provide a new and improved air bag inflator and more particularly, a new and improved, strong, lightweight lower-cost, housing or canister for an air bag inflator.

It is an object of the present invention to provide an air bag inflator housing which utilizes sheet metal components and crimp-forming operations to close the inflator housing rather than welding operations for final assembly.

Another object of the present invention is to provide a new and improved air bag inflator housing which utilizes a stamped out, forged or cold drawn, hollow, metal rivet like, inner wall forming a central ignition chamber.

Another object of the present invention is to provide a new and improved housing for an air bag inflator having an inner ignition chamber wall with a reduced thickness which may be crimp-formed to join and seal with an annular housing base.

Another object of the present invention is to provide a new and improved air bag inflator housing which utilizes a central rivet-like element closed at one end and open at the other for receiving an ignition system, and which element provides structural reinforcement for central portions of a top wall and an opposite base.

Still another object of the present invention is to provide a new and improved inflator housing which utilizes crimp-formed joints between side walls and opposite end walls or top and base walls of the housing.

Yet another object of the present invention is to provide a new and improved air bag inflator housing having only a pair of side walls and utilizing crimped joints between the side walls and end walls to define an inner central ignition chamber and a surrounding outer combustion/filter chamber.

Another object of the present invention is to provide a new and improved air bag inflator housing having crimped joints between end walls and side walls which allows the use of compressible seal rings for preventing filter blow-by during the combustion process and providing a hermetic seal against the outside environment.

Yet another object of the present invention is to provide a new and improved air bag inflator housing which minimizes the number of hermetic or air-tight seals that are required and utilizing pressure-crimped joints between inner and outer side walls and opposite end walls.

It is an object of the present invention to provide a new and improved air bag inflator which is assembled using a radial forming and welding operation wherein a central portion of a base is structurally supported by radially deforming material from a thin wall portion at the lower end of a stepped ignition chamber wall of a rivet-like element.

It is an object of the present invention to provide a new and improved air bag inflator having an outer housing wall initially oriented in a vertical direction and then deformed radially inwardly to overlap an edge portion of an annular base forming structural attachment at an outer periphery of the inflator housing wall of the inflator.

It is another object of the present invention to provide a new and improved air bag inflator having a housing with an annular lip around a peripheral outer edge captured between a portion of an outer side wall and a radially inwardly and upwardly deformed portion thereof.

It is another object of the present invention to provide a new and improved air bag inflator having a housing with a stepped wall for supportively engaging an annular base to eliminate crushing of a filter in the housing during a final crimp-forming operation joining the base and diffuser wall.

BRIEF SUMMARY OF THE PRESENT INVENTION

The foregoing and other objects and advantages of the present invention are accomplished in a new and improved air bag inflator having a diffuser housing including concentric inner and outer, ported side walls and a pair of opposite end walls joined therewith to form a sealed enclosure for containing solid gas generant material and an ignition system therefor. The inner side wall forms a central ignition chamber for an ignition system has a plurality of ignition wall ports in direct communication with an annular combination combustion and filter-containing chamber surrounding and formed around the ignition chamber for holding a quantity of solid gas generant material and a filter. The outer side wall has a plurality of gas discharging, diffuser ports for directing the gas generated in the inflator housing to rapidly inflate an associated air bag. The inner side wall and the outer side wall are joined to at least one of the end walls for sealing and closing the housing by means of a crimp-formed joint. This enables the housing to be constructed of relatively low-cost metal tube, sheet and plate materials and provides for a faster and easier assembly of the inflator and internal components. The inner side wall comprises a depending cylindrical skirt of a rivet-like ignition containing housing element closed at the upper end and open at the lower end to receive the ignition system of the inflator. The outer side wall is integrally joined to the outer periphery of an annular top wall having a central opening aligned with a similar opening coaxially aligned formed in an annular base or bottom wall spaced from the top wall. The ported inner side wall of the rivet-like element extends downwardly through the aligned openings in both the top wall and the base, and is formed with a stepped lower end portion comprising a thin wall section below an annular stop surface which supports the base when the thin wall section is deformed radially outwardly in a crimp-forming operation for securing the inner side wall and base together. Various types of crimp-forming operations are provided around the outer periphery of the annular base and a lower end portion of the outer side wall to join these members together to complete and sealingly close the housing. By joining lower end portions of both the inner side wall and the outer side wall by means of crimp-formed joints with the annular base, the housing may be constructed of relatively low-cost metal tube, sheet and plate materials and may be assembled in a faster and easier process, realizing great savings in time and cost.

BRIEF DESCRIPTION OF THE DRAWINGS

For a better understanding of the present invention, reference should be had to the following detailed description taken in conjunction with the drawings, in which.

DETAILED DESCRIPTION OF PREFERRED EMBODIMENTS OF THE PRESENT INVENTION

Figure 1:
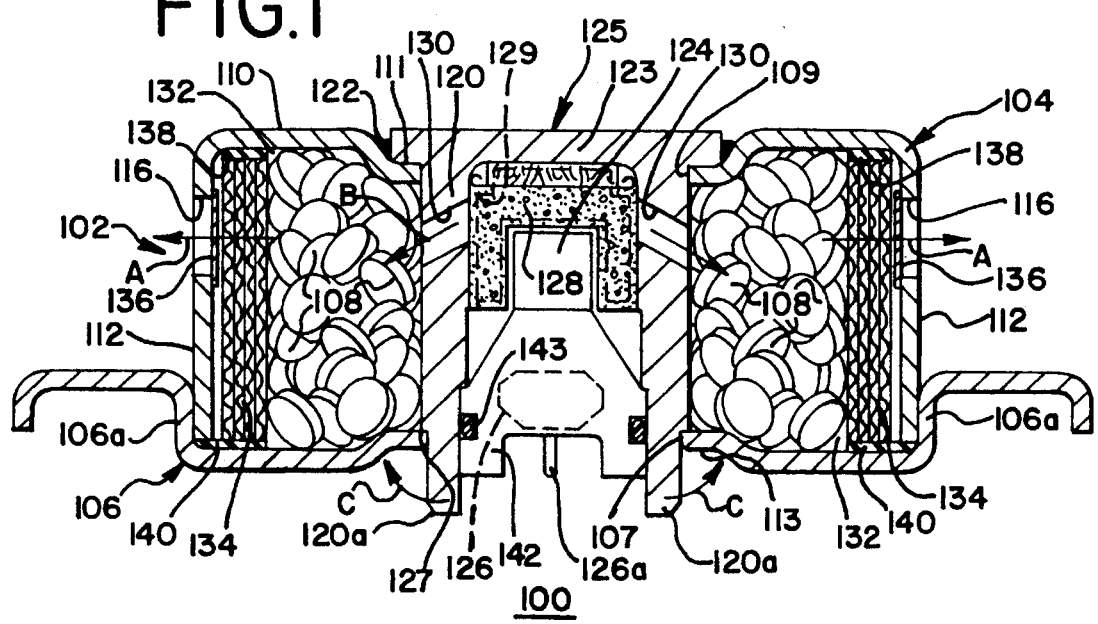
FIG. 1 is a diametrical cross-sectional view of a first embodiment of a new and improved air bag inflator and housing constructed in accordance with the features of the present invention in a partially assembled condition.
Figure 2:
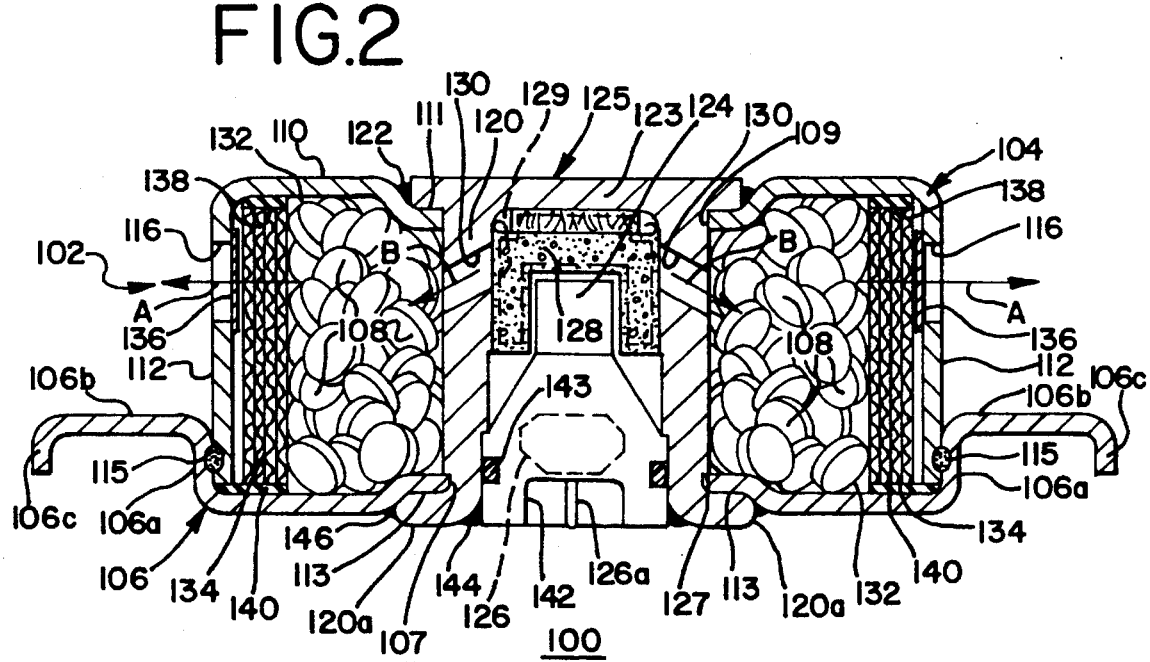
FIG. 2 is a diametrical cross-sectional view of the air bag inflator and housing of FIG. 1 shown in a fully assembled condition.

Referring now more particularly to FIGS. 1 and 2, therein is illustrated a first embodiment of a new and improved air bag inflator for rapidly inflating an air bag (not shown) upon triggered actuation constructed in accordance with the features of the present invention and referred to generally by the reference numeral 100. Inflator 100 includes a housing or canister 102 formed of strong, lightweight metal such as aluminum or steel sheet or plate material having an upper, inverted cup-shaped diffuser cover 104 and a generally circular, annular base 106 having a central opening 107 formed thereon and joined to form a sealed enclosure or housing for containing a quantity of solid, gas generant material 108 in the form of pellets or wafers which rapidly combust to provide a necessary volume of inflation gas for the rapid deployment of an air bag in communication with the inflator 100.

The diffuser cover 104 includes an annular top wall 110 and an integrally formed, downwardly depending, cylindrical outer side wall 112. The cylindrical outer wall 112 and the annular circular top wall 110 may be formed of sheet aluminum or steel, and the outer side wall 112 is provided with a plurality of gas discharge diffuser ports 116 arranged in a ring around the periphery for directing the gas generated in the housing 102 to flow radially outwardly into an air bag (not shown) as indicated by the radially extending arrows A. The annular top wall 110 is formed with a circular opening 109 at the center in coaxial alignment with the central opening 107 in the annular base 106. The top wall 110 is formed with an annular, downwardly depressed shoulder 111 at a level below the upper surface of an outer portion of the top wall extending radially outwardly thereof and immediately encircling the central opening 109.

In accordance with the present invention, the inflator 100 also includes a centrally disposed, cylindrical inner side wall 120 in coaxial alignment with the outer side wall 112. A rivet-like ignition housing member 125 (FIG. 11) fabricated of metal in a forging, deep drawing, or stamping operation includes a circular upper end wall 123 integrally joining the depending inner side wall 120 and closing off the upper end of a central ignition chamber 124 provided in the housing 102. The circular upper end wall 123 extends radially outwardly of the central opening 109 a short distance and is sealed with the shoulder surface 111 of the top wall 110 by an annular weld 122, a hermetic seal ring, gasket, or other sealing and joining method. The outer upper surfaces of the top wall 110 and the upper end wall 123 of the rivet-like housing member 125 are substantially aligned as shown to provide a flat upper surface overall for the housing 102. The ignition chamber 124 contains an electrically activated ignition squib 126 and a charge 128 of an ignition-enhancing material contained within an igniter cup 129 positioned in the upper end portion of the chamber. The ignition squib 126 mounted in an adapter plug 142 is electrically activated and includes a pair of downwardly depending electrical terminals 126a adapted for connection to an external electrical activation system of a motor vehicle.

The inner side wall 120 is formed with a plurality of ignition ports 130 in direct communication between the ignition chamber 124 and an outer, surrounding, annular, combination combustion and filter-containing chamber 132. The gas generant material 108 is arranged in an annular mass in an inner portion of the chamber 132 and is encircled by an outer, annular gas filter 134 mounted adjacent the inside surface of the outer side wall 112. The ignition chamber wall ports 130 direct hot combustion products from the ignition squib 126 and the ignition enhancing material 128 into the annulus of gas generant pellets 108 as indicated by the arrows B.

A variety of different types of annular gas filters 134 may be utilized; and in general, the filter includes a large area, cylindrically-shaped, inner face or inlet side, for receiving hot combustion products generated in the housing 102 and an outer surface in facing confrontation with the diffuser discharge ports 116 in the ported outer side wall 112. The diffuser wall ports 116 are sealed off against the entry of outside contaminants during the life of the inflator 100 before activation by means of a thin adhesively secured, sealing tape 136, which tape is readily ruptured by a predetermined gas pressure when activation of the inflator 100 takes place. Upper and lower annular end surfaces of the filter 134 may be sealed against the underside of the top wall 110 and the upper surface of the base wall 106, respectively, by a pair of resilient, annular, sealing rings or gaskets 138 and 140 in order to prevent blow-by of the hot gases around the upper and lower annular end faces of the gas filter 134. The sealing rings 138 and 140 ensure good filtering action by containing the gas flow within the available flow cross-section of the gas filter 134 until the gas exits the outer face to reach the diffuser wall gas discharge ports 116.

Figure 11:
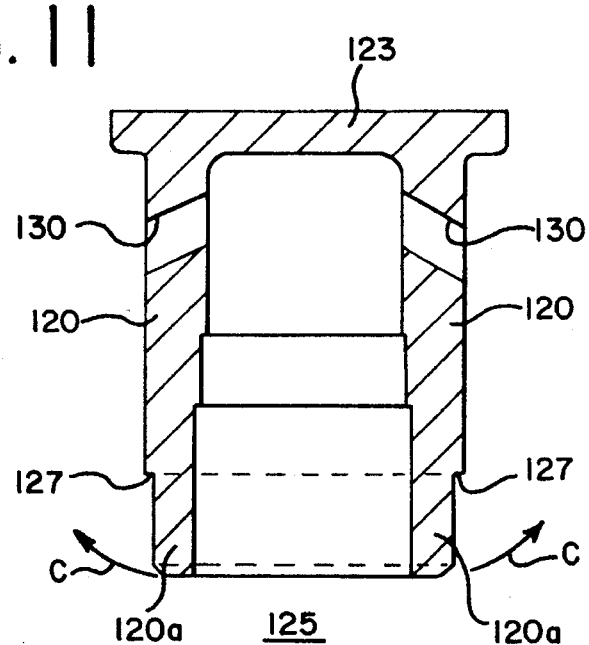
FIG. 11 is a diametrical cross-sectional view of an individual, rivet-like ignition housing member for use in air bag inflators in accordance with the features of the present invention.

Referring now to FIGS. 1 and 11, in accordance with an important feature of the present invention, a thin wall segment at a lower end portion 120*a* of the cylindrical inner side wall 120 projects downwardly below the underside of the annular base 106 and is adapted to be crimp-formed over and radially outwardly (Arrows C—FIG. 1) toward an adjacent inwardly depressed annular recess 113 on the underside surface of the base around the central opening 107. An annular step or shoulder 127 is formed at the juncture of a relatively thick upper wall portion of the inner side wall 120 and the relatively thin wall lower end portion 120*a*. The annular step 127 acts as a stop to support the recessed surface portion 113 of the base 106 as the thin wall segment 120*a* is crimp-formed over radially outwardly (Arrows C—FIG. 2) toward the closing position of FIG. 2 to complete the sealing or closing of the housing 102 around the lower end of the rivet-like central ignition housing member 125.

An adapter plug 142, preferably formed of metal holds and supports the electrically activated ignition squib 126 and the plug is seated in place to close the lower end of the ignition chamber 124 after the cup 129 of ignition enhancing material 128 has first been inserted. An "O" ring 143 may be provided to seal between the body of the adapter plug 142 and the inside surface of the inner side wall 120 of the rivet-like housing member 125, and then the adapter plug 142 may be press-fitted into place as shown. The adapter plug 142 may also be secured to the base wall 106 by an annular weld 144 to provide a hermetic seal.

In accordance with the present invention, the annular base 106 includes an outer pre-formed upturned vertical flange 106*a* which is laser welded as at 115 to a lower end portion 112*a* of the diffuser outer side wall 112. The upwardly projecting flange 106*a* is pre-formed to have an interference fit with the diffuser side wall portion 112*a*. This ensures a tight fit between both components and a good weld 115. The base 106 also includes a mounting flange 106*b* formed to project radially outwardly of the portion 106*a* for serving as a convenient means for attachment and mounting of the inflator 100 in a steering wheel hub of a motor vehicle. To add further stiffness and strength, a downturned, annular lip 106*c* is provided at the outer edge of the radial mounting flange portion 106*b* of the base 106.

The use of cold forming operation in crimping over the lower end portion 120*a* of the stepped inner side wall 120 against the recess edge portion 113 around the central opening 107 of the base 106 and the laser welding of the annular outer flange 106*a* of the base to the cylindrical outer side wall 112 greatly facilitates the rapid assembly of the air bag inflator 100 and allows the use of relatively lower cost sheet material of aluminum or steel instead of more expensive cast or forged structures. The crimp-forming operations used in joining the inner side wall 120 to the base wall 106, provides positive compression on the blow-by seals 138 and 140 acting on the filter 134.

Figure 3:
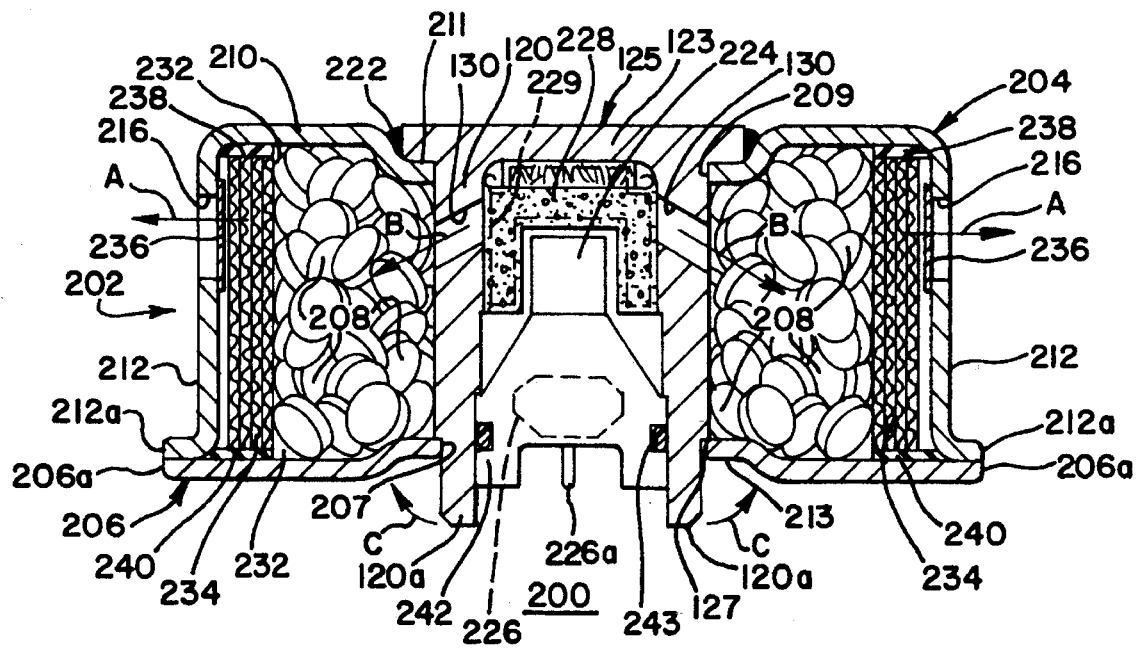
FIG. 3 is a diametrical cross-sectional view of a second embodiment of a new and improved air bag inflator and housing constructed in accordance with the features of the present invention in a partially assembled condition.
Figure 4:
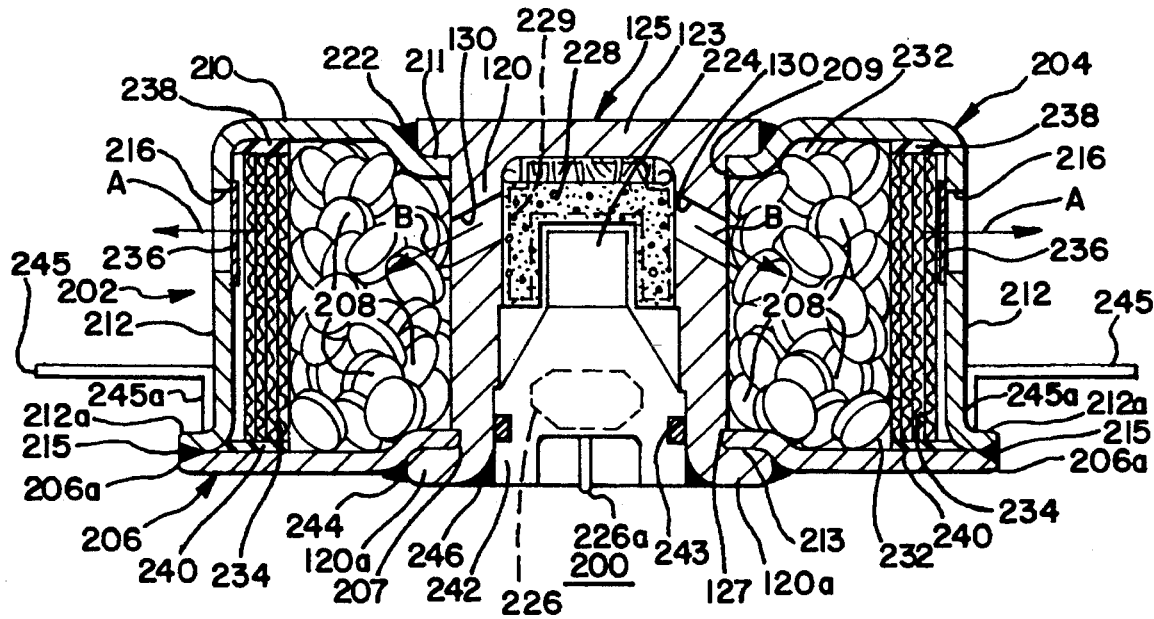
FIG. 4 is a diametrical cross-sectional view of the air bag inflator and housing of FIG. 3 shown in a fully assembled condition.

Referring now more particularly to FIGS. 3 and 4, therein is illustrated a second embodiment of a new and improved air bag inflator for rapidly inflating an air bag constructed in accordance with the features of the present invention and referred to generally by the reference numeral 200. The inflator 200 includes a housing or canister 202 formed of strong, lightweight metal such as aluminum or steel, sheet or plate material having an upper, inverted cup-shaped diffuser cover 204 and a generally circular, annular base or bottom wall 206 having a central opening 207 formed thereon and joined to form a sealed enclosure or housing for containing a quantity of solid, gas generant material 208 in the form of pellets or wafers which rapidly combust to provide a necessary volume of inflation gas for the rapid deployment of an air bag in communication with the inflator 200.

The diffuser cover 204 includes an annular top wall 210 and an integrally formed, downwardly depending, cylindrical outer side wall 212. The cylindrical outer wall 212 and the annular circular top wall 210 may be formed of sheet aluminum or steel in a spin-forming or deep draw operation, and the outer side wall 212 is provided with a plurality of gas discharge diffuser ports 216 arranged in a ring around the periphery for directing the gas generated in the housing 202 to flow radially outwardly into an air bag (not shown) as indicated by the radially extending arrows A. The annular top wall 210 is formed with a circular opening 209 at the center in coaxial alignment with the central opening 207 in the annular base 206. The top wall 210 is formed with an annular, downwardly depressed shoulder 211 at a level below the upper surface of an outer portion of the top wall extending radially outwardly thereof and immediately encircling the central opening 209.

In accordance with the present invention, the inflator 200 also includes a centrally disposed, cylindrical inner side wall 120 in coaxial alignment with the outer side wall 212. A rivet-like ignition housing member 125 (FIG. 11) fabricated of metal in a forging, deep drawing, or stamping operation includes a circular upper end wall 123 integrally joining the depending inner side wall 120 and closing off the upper end of a central ignition chamber 224 provided in the housing 202. The circular upper end wall 123 extends radially outwardly of the central opening 209 a short distance and is sealed with the shoulder surface 211 of the top wall 210 by an annular weld 222, a hermetic seal ring or gasket, or other sealing and joining method. The outer upper surfaces of the top wall 210 and the upper end wall 123 of the rivet-like housing member 125 are substantially aligned as shown to provide a flat overall upper surface for the housing 202. The ignition chamber 224 contains an electrically activated ignition squib 226 and a charge 228 of an ignition-enhancing material contained within an igniter cup 229 positioned in the upper end portion of the chamber. The ignition squib 226 is electrically activated and includes a pair of downwardly depending electrical terminals 226a adapted for connection to an external electrical activation system of a motor vehicle.

The inner side wall 120 is formed with a plurality of ignition ports 130 in direct communication between the ignition chamber 224 and an outer, surrounding, annular, combination combustion and filter-containing chamber 232. The gas generant material 208 is arranged in an annular mass in an inner portion of the chamber 232 and is encircled by an outer, annular gas filter 234 mounted adjacent the inside surface of the outer side wall 212. The ignition chamber wall ports 130 direct hot combustion products from the ignition squib 226 and the ignition enhancing material 228 into the annulus of gas generant pellets 208 as indicated by the arrows B.

A variety of different types of annular gas filters 234 may be utilized; and in general, the filter includes a large area, cylindrically-shaped, inner face or inlet side, for receiving hot combustion products generated in the housing 202 and an outer surface in facing confrontation with the diffuser discharge ports 216 in the ported outer side wall 212. The diffuser wall ports 216 are sealed off against the entry of outside contaminants during the life of the inflator 200 before activation by means-of a thin adhesively secured, sealing tape 236, which tape is readily ruptured by gas pressure when activation of the inflator 200 to fill an associated air bag takes place. Upper and lower annular end surfaces of the filter 234 are sealed against the underside of the top wall 210 and the upper surface of the base wall 206, respectively, by a pair of resilient, annular, sealing ring gaskets 238 and 240 in order to prevent blow-by of the hot gases around the upper and lower annular end faces of the 426a gas filter 234. The sealing rings 238 and 240 ensure good filtering action by containing the gas flow within the available flow cross-section of the gas filter 234 until the gas exits the outer face to reach the diffuser wall gas discharge ports 216.

Referring now to FIGS. 3 and 11, in accordance with an important feature of the present invention, a thin wall segment at a lower end portion 120a of the cylindrical inner side wall 120 projects downwardly below the underside of the annular base 206 and is adapted to be crimp-formed over and radially outwardly (Arrows C—FIG. 3) toward an adjacent inwardly depressed annular recess 213 on the underside surface of the base around the central opening 207.

An annular step or shoulder 127 is formed at the juncture of a relatively thick upper wall portion of the inner side wall 120 and the relatively thin wall lower end portion 120a. The annular step 127 acts as a stop to support the recessed surface portion 213 of the base 206 as the thin wall segment 120a is crimp-formed over radially outwardly (Arrows C—FIG. 3) toward the closing position of FIG. 4 to complete the sealing or closing of the housing 202 around the lower end of the rivet-like central ignition housing member 125.

An adapter plug 242, preferably formed of metal holds and supports the electrically activated ignition squib 226 and the plug is seated in place to close the lower end of the ignition chamber 224 after the cup 229 of ignition enhancing material 228 has first been inserted. An "O" ring 243 may be provided to seal between the body of the adapter plug 242 and the inside surface of the inner side wall 120 of the rivet-like housing member 125, and then the adapter body may be press-fitted into place as shown. The adapter 242 may also be secured to the base wall 206 by an annular weld 244. An annular weld 246 may be located between the inner side wall portion 120a and the base wall 206 to provide a hermetic seal.

At a lower end, the outer side wall 212 is formed with a narrow, radially outwardly extending end flange or lip 212a secured to an outer edge portion 206a of the base 206 by a weld 215 (FIG. 4) to provide a hermetic seal. A radially extending, annular mounting flange 245 having an inner cylindrical collar 245a is press fitted or otherwise attached to the outer side wall 212 above the flange 212a.

The use of cold forming operation in crimping over the lower end portion 120a of the stepped inner side wall 120 against the recess edge portion 213 around the central opening 207 of the base 206 and the annular weld 215 (FIG. 4) of an outer edge 206a of the base to the end flange or lip 212a the cylindrical outer side wall 212 greatly facilitates the rapid assembly of the air bag inflator 200 and allows the use of relatively lower cost sheet material such as aluminum or steel instead of more expensive cast or forged structures. The crimp-forming operations used in joining the inner side walls 120 to the base wall 206, provides positive compression on the blow-by seals 238 and 240 acting on the filter 234.

Figure 5:
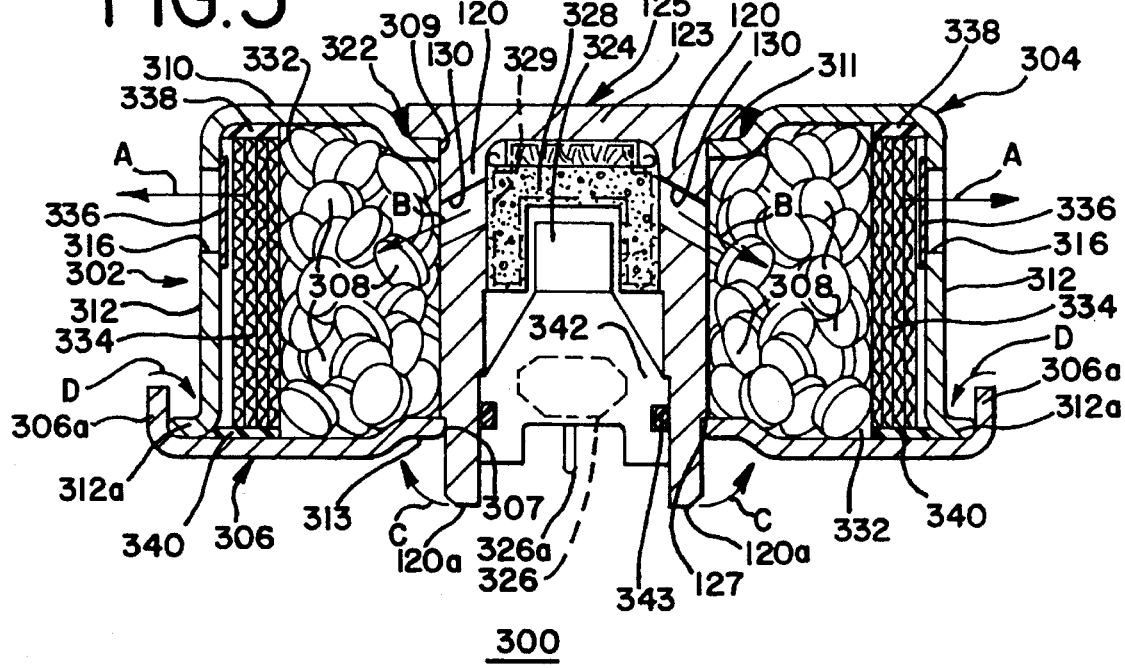
FIG. 5 is a diametrical cross-sectional view of third embodiment of a new and improved air bag inflator and housing constructed in accordance with the features of the present invention in a partially assembled condition.
Figure 6:
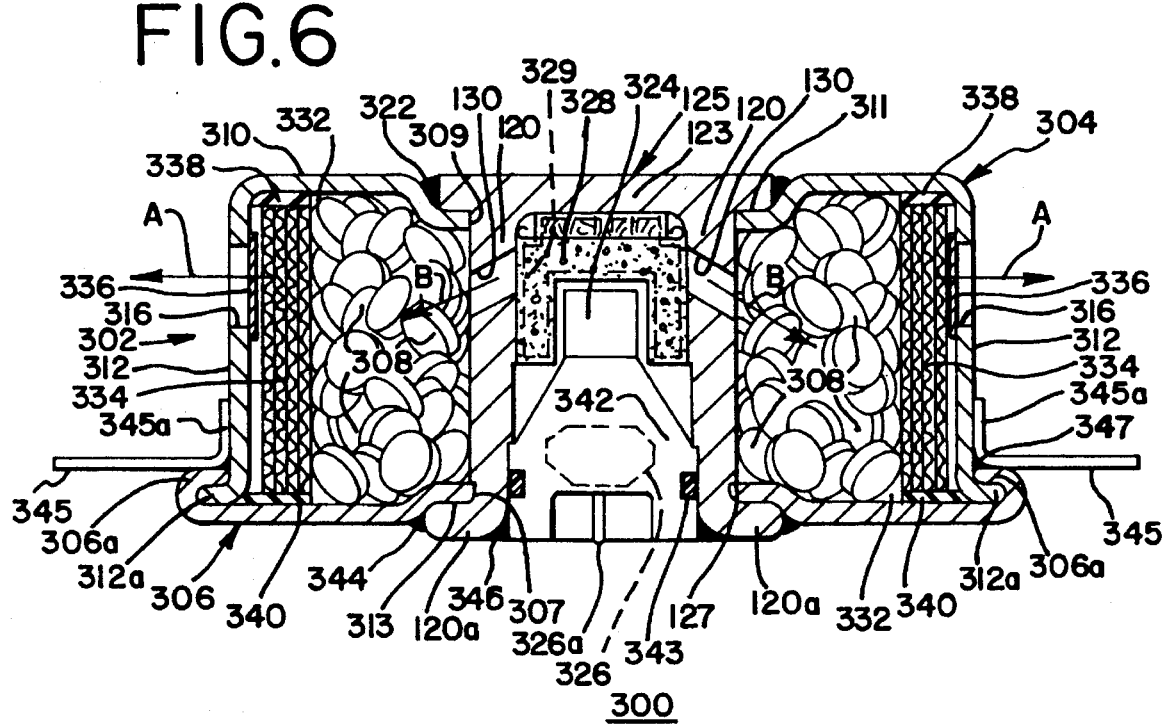
FIG. 6 is a diametrical cross-sectional view of the air bag inflator and housing of FIG. 5 shown in a fully assembled condition.

Referring now more particularly to FIGS. 5 and 6, therein is illustrated a third embodiment of a new and improved air bag inflator for rapidly inflating an air bag constructed in accordance with the features of the present invention and referred to generally by the reference numeral 300. The inflator 300 includes a housing or canister 302 formed of strong, lightweight metal such as aluminum or steel, sheet or plate material having an upper, inverted cup-shaped diffuser cover 304 and a generally circular, annular base or bottom wall 306 having a central opening 307 formed thereon and joined to form a sealed enclosure or housing for containing a quantity of solid, gas generant material 308 in the form of pellets or wafers which rapidly combust to provide a necessary volume of inflation gas for the rapid deployment of an air bag in communication with the inflator 300.

The diffuser cover 304 includes an annular top wall 310 and an integrally formed, downwardly depending, cylindrical outer side wall 312. The cylindrical outer wall 312 and the annular circular top wall 310 may be formed of sheet aluminum or steel in a spin-forming or deep draw operation, and the outer side wall 312 is provided with a plurality of gas discharge diffuser ports 316 arranged in a ring around the periphery for directing the gas generated in the housing 302 to flow radially outwardly into an air bag (not shown) as indicated by the radially extending arrows A. The annular top wall 310 is formed with a circular opening 309 at the center in coaxial alignment with the central opening 307 in the annular base 306. The top wall 310 is formed with an annular, downwardly depressed shoulder 311 at a level below the upper surface of an outer portion of the top wall extending radially outwardly thereof and immediately encircling the central opening 309.

In accordance with the present invention, the inflator 300 also includes a centrally disposed, cylindrical inner side wall 120 in coaxial alignment with the outer side wall 312. A rivet-like ignition housing member 125 (FIG. 11) fabricated of metal in a forging, deep drawing, or stamping operation includes a circular upper end wall 123 integrally joining the depending inner side wall 120 and closing off the upper end of a central ignition chamber 324 provided in the housing 302. The circular upper end wall 123 extends radially outwardly of the central opening 309 a short distance and is sealed with the shoulder surface 311 of the top wall 310 by an annular weld 322, a hermetic seal ring, gasket, or other sealing and joining method. The outer upper surfaces of the top wall 310 and the upper end wall 123 of the rivet-like housing member 125 are substantially aligned as shown to provide a flat overall upper surface for the housing 302. The ignition chamber 324 contains an electrically activated ignition squib 326 and a charge 328 of an ignition-enhancing material contained within an igniter cup 329 positioned in the upper end portion of the chamber. The ignition squib 326 is electrically activated and includes a pair of downwardly depending electrical terminals 326a adapted for connection to an external electrical activation system of a motor vehicle.

The inner side wall 120 is formed with a plurality of ignition ports 130 in direct communication between the ignition chamber 324 and an outer, surrounding, annular, combination combustion and filter-containing chamber 332. The gas generant material 308 is arranged in an annular mass in an inner portion of the chamber 332 and is encircled by an outer, annular gas filter 334 mounted adjacent the inside surface of the outer side wall 312. The ignition chamber wall ports 130 direct hot combustion products from the ignition squib 326 and the ignition enhancing material 328 into the annulus of gas generant pellets 308 as indicated by the arrows B.

A variety of different types of annular gas filters 334 may be utilized; and in general, the filter includes a large area, cylindrically-shaped, inner face or inlet side, for receiving hot combustion products generated in the housing 302 and an outer surface in facing confrontation with the diffuser discharge ports 316 in the ported outer side wall 312. The diffuser wall ports 316 are sealed off against the entry of outside contaminants during the life of the inflator 300 before activation by means of a thin adhesively secured, sealing tape 336, which tape is readily ruptured by gas pressure when activation of the inflator 300 to fill an associated air bag takes place. Upper and lower annular end surfaces of the filter 334 are sealed against the underside of the top wall 310 and the upper surface of the base wall 306, respectively, by a pair of resilient, annular, sealing ring gaskets 338 and 340 in order to prevent blow-by of the hot gases around the upper and lower annular end faces of the gas filter 334. The sealing rings 338 and 340 ensure good filtering action by containing the gas flow within the available flow cross-section of the gas filter 334 until the gas exits the outer face to reach the diffuser wall gas discharge ports 316.

Referring now to FIGS. 5 and 11, in accordance with an important feature of the present invention, a thin wall segment at a lower end portion 120a of the cylindrical inner side wall 120 projects downwardly below the underside of the annular base 306 and is adapted to be crimp-formed over and radially outwardly (Arrows C—FIG. 5) toward an adjacent inwardly depressed annular recess 313 on the underside surface of the base around the central opening 307.

An annular step or shoulder 127 is formed at the juncture of a relatively thick upper wall portion of the inner side wall 120 and the relatively thin wall lower end portion 120a. The annular step 127 acts as a stop to support the recessed surface portion 313 of the base 306 as the thin wall segment 120a is crimp-formed over radially outwardly (Arrows C—FIG. 5) toward the closing position of FIG. 6 to complete the sealing or closing of the housing 302 around the lower end of the rivet-like central ignition housing member 125.

An adapter plug 342, preferably formed of metal holds and supports the electrically activated ignition squib 326 and the plug is seated in place to close the lower end of the ignition chamber 324 after the cup 329 of ignition enhancing material 328 has first been inserted. A seal 343 may be provided to seal between the body of the adapter plug 342 and the inside surface of the inner side wall 120 of the rivet-like housing member 125, and then the adapter body may be press-fitted into place as shown. The adapter 342 may also be secured to the base wall 306 by an annular weld 344. An annular weld 346, a seal ring or a gasket, may be located between or to the inner side wall portion 120a and the base wall 306 to provide a hermetic seal. An optional annular weld 345 (FIG. 6) between the thin wall segment 120a and a lower end portion of an adapter plug 342 may also be provided.

At a lower end, the outer side wall 312 is formed with a narrow, radially outwardly extending end flange or lip 312a and the base 306 is provided with an upwardly projecting flange 306a (FIG. 5) adapted to be crimp-formed over (Arrows D) to a radially inwardly directed position (FIG. 6) to engage an upper surface of the wall flange or lip 312a to provide a structural closure. A separate seal 346 or seal ring 340 may be wholly or partially trapped by this joint to form a hermetic seal. A radially extending, annular mounting flange 345 having an inner cylindrical collar 345a is press fitted or otherwise attached to the outer side wall 312 above the flange 312a.

The use of cold forming operation in crimping over the lower end portion 120a of the stepped inner side wall 120 against the recess edge portion 313 around the central opening 307 of the base 306 and the crimped-over upwardly and radially inwardly extending edge 306a of the base engaging the end flange or lip 312a of the cylindrical outer side wall 312 greatly facilitates the rapid assembly of the air bag inflator 300 and allows the use of relatively lower cost sheet material of aluminum or steel instead of more expensive cast or forged structures. The crimp-forming operations used in joining the inner and outer side walls 120 and 312, respectively, to the base wall 306, also provides positive compression on the blow-by seals 338 and 340 acting on the filter 334.

Figure 7:
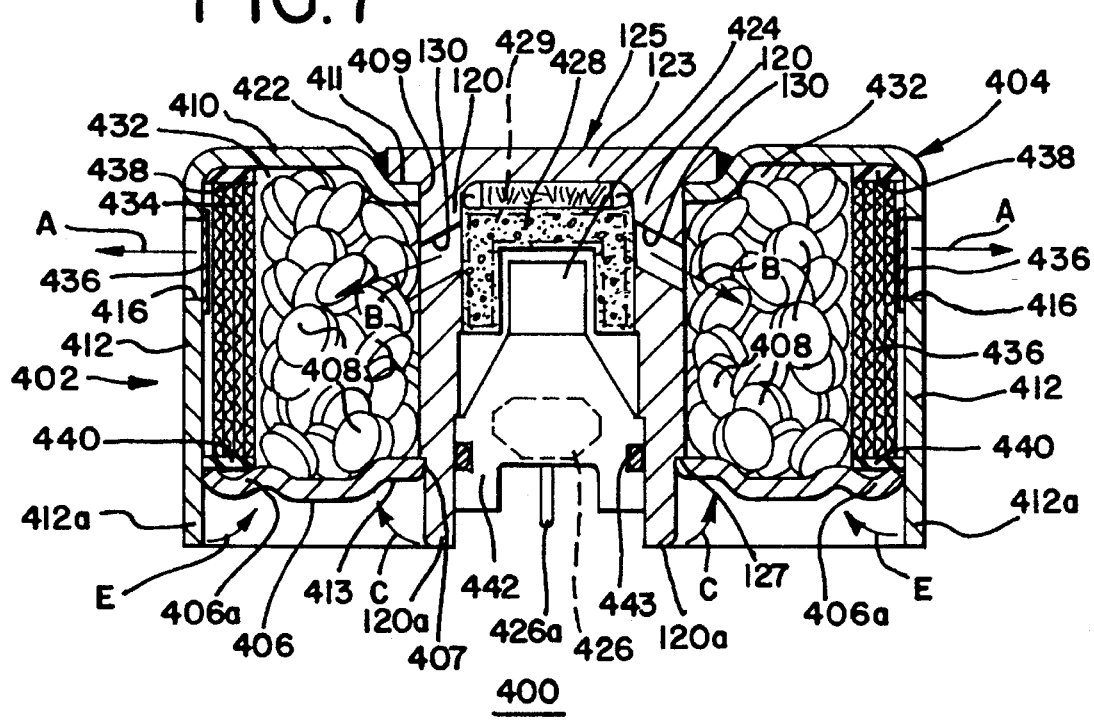
FIG. 7 is a diametrical cross-sectional view of a fourth embodiment of a new and improved air bag inflator and housing constructed in accordance with the features of the present invention in a partially assembled condition.
Figure 8:
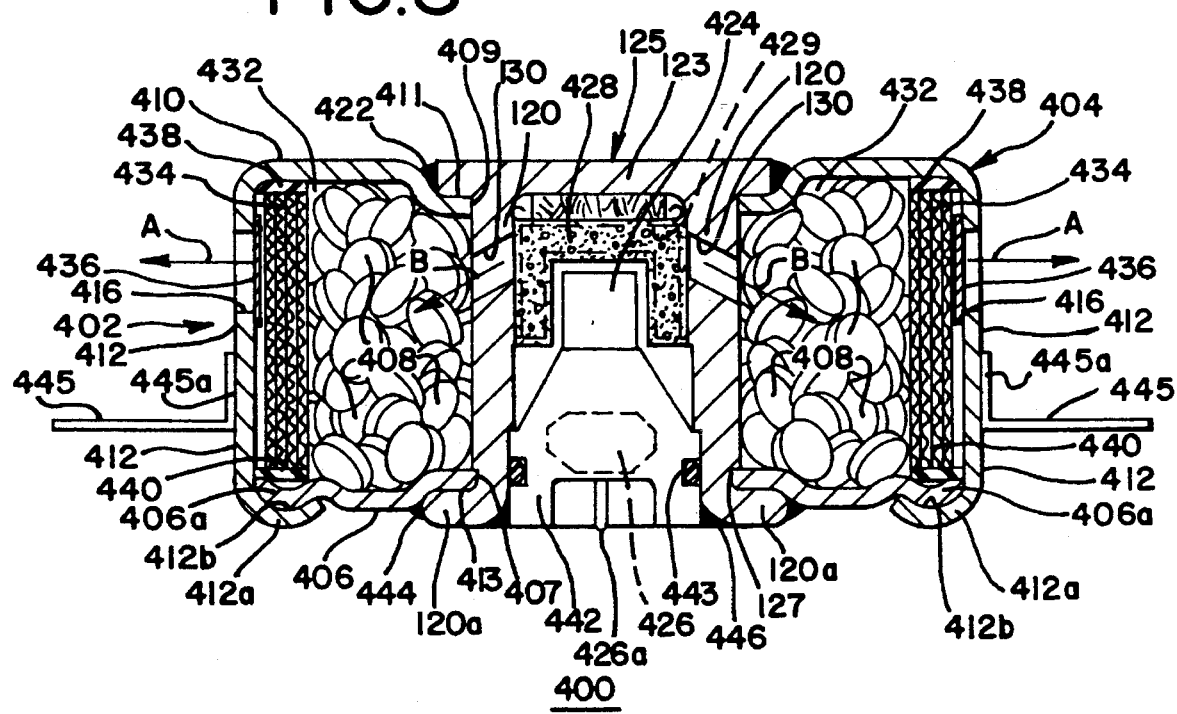
FIG. 8 is a diametrical cross-sectional view of the air bag inflator and housing of FIG. 7 shown in a fully assembled condition.

Referring now more particularly to FIGS. 7 and 8, therein is illustrated a fourth embodiment of a new and improved air bag inflator for rapidly inflating an air bag constructed in accordance with the features of the present invention and referred to generally by the reference numeral 400. The inflator 400 includes a housing or canister 402 formed of strong, lightweight metal such as aluminum or steel, sheet or plate material having an upper, inverted cup-shaped diffuser cover 404 and a generally circular, annular base or bottom wall 406 having a central opening 407 formed thereon and joined to form a sealed enclosure or housing for containing a quantity of solid, gas generant material 408 in the form of pellets or wafers which rapidly combust to provide a necessary volume of inflation gas for the rapid deployment of an air bag in communication with the inflator 400.

The diffuser cover 404 includes an annular top wall 410 and an integrally formed, downwardly depending, cylindrical outer side wall 412. The cylindrical outer wall 412 and the annular circular top wall 410 may be formed of sheet aluminum or steel in a spin-forming or deep draw operation, and the outer side wall 412 is provided with a plurality of gas discharge diffuser ports 416 arranged in a ring around the periphery for directing the gas generated in the housing 402 to flow radially outwardly into an air bag (not shown) as indicated by the radially extending arrows A. The annular top wall 410 is formed with a circular opening 409 at the center in coaxial alignment with the central opening 407 in the annular base 406. The top wall 410 is formed with an annular, downwardly depressed shoulder 411 at a level below the upper surface of an outer portion of the top wall extending radially outwardly thereof and immediately encircling the central opening 409.

In accordance with the present invention, the inflator 400 also includes a centrally disposed, cylindrical inner side wall 120 in coaxial alignment with the outer side wall 412. A rivet-like ignition housing member 125 (FIG. 11) fabricated of metal in a forging, deep drawing, or stamping operation includes a circular upper end wall 123 integrally joining the depending inner side wall 120 and closing off the upper end of a central ignition chamber 424 provided in the housing 402. The circular upper end wall 123 extends radially outwardly of the central opening 409 a short distance and is sealed with the shoulder surface 411 of the top wall 410 by an annular weld 422, a hermetic seal ring, gasket, or other sealing and joining method. The outer upper surfaces of the top wall 410 and the upper end wall 123 of the rivet-like housing member 125 are substantially aligned as shown to provide a flat overall upper surface for the housing 402. The ignition chamber 424 contains an electrically activated ignition squib 426 and a charge 428 of an ignition-enhancing material contained within an igniter cup 429 positioned in the upper end portion of the chamber. The ignition squib 426 is electrically activated and includes a pair of downwardly depending electrical terminals 426a adapted for connection to an external electrical activation system of a motor vehicle.

The inner side wall 120 is formed with a plurality of ignition ports 130 in direct communication between the ignition chamber 424 and an outer, surrounding, annular, combination combustion and filter-containing chamber 432. The gas generant material 408 is arranged in an annular mass in an inner portion of the chamber 432 and is encircled by an outer, annular gas filter 434 mounted adjacent the inside surface of the outer side wall 412. The ignition chamber wall ports 130 direct hot combustion products from the ignition squib 426 and the ignition enhancing material 428 into the annulus of gas generant pellets 408 as indicated by the arrows B.

A variety of different types of annular gas filters 434 may be utilized; and in general, the filter includes a large area, cylindrically-shaped, inner face or inlet side, for receiving hot combustion products generated in the housing 402 and an outer surface in facing confrontation with the diffuser discharge ports 416 in the ported outer side wall 412. The diffuser wall ports 416 are sealed off against the entry of outside contaminants during the life of the inflator 400 before activation by means of a thin adhesively secured, sealing tape 436, which tape is readily ruptured by gas pressure when activation of the inflator 400 to fill an associated air bag takes place. Upper and lower annular end surfaces of the filter 434 are sealed against the underside of the top wall 410 and the upper surface of the base wall 406, respectively, by a pair of resilient, annular, sealing ring gaskets. 438 and 440 in order to prevent blow-by of the hot gases around the upper and lower annular end faces of the gas filter 434. The sealing rings 438 and 440 ensure good filtering action by containing the gas flow within the available flow cross-section of the gas filter 434 until the gas exits the outer face to reach the diffuser wall gas discharge ports 416.

Referring now to FIGS. 7 and 11, in accordance with an important feature of the present invention, a thin wall segment at a lower end portion 120a of the cylindrical inner side wall 120 projects downwardly below the underside of the annular base 406 and is adapted to be crimp-formed over and radially outwardly (Arrows C—FIG. 7) toward an adjacent inwardly depressed annular recess 413 on the underside surface of the base around the central opening 407.

An annular step or shoulder 127 is formed at the juncture of a relatively thick upper wall portion of the inner side wall 120 and the relatively thin wall lower end portion 120a. The annular step 127 acts as a stop to support the recessed surface portion 413 of the base 406 as the thin wall segment 120a is crimp-formed over radially outwardly (Arrows C—FIG. 7) toward the closing position of FIG. 8 to complete the sealing or closing of the housing 402 around the lower end of the rivet-like central ignition housing member 125.

An adapter plug 442, preferably formed of metal holds and supports the electrically activated ignition squib 426 and the plug is seated in place to close the lower end of the ignition chamber 424 after the cup 429 of ignition enhancing material 428 has first been inserted. An "O" ring 443 may be provided to seal between the body of the adapter plug 442 and the inside surface of the inner side wall 120 of the rivet-like housing member 125, and then the adapter body may be press-fitted into place as shown. The adapter 442 may also be secured to the base wall 406 by an annular weld 444. An annular weld 446, a seal ring or a gasket may be located between the inner side wall portion 120a and the base wall 406 to provide a hermetic seal.

The outer side wall 412 is formed with a lower end portion 412a extending below the base 406 (FIG. 7) and this lower end portion is crimped over (Arrows E) to extend downwardly, radially inwardly and then upwardly (FIG. 8) forming an annular groove 412b for receiving an outer edge portion 406a of the base wall 406 which is stamp formed with a matching groove profile to interfit with the crimp-formed outer side wall lower end portion 412a. The interfitting grooved portions 412a and 406a of the outer side wall 412 and base 406 provide an extremely strong structure at the lower outer periphery of the housing 402. A radially extending, annular mounting flange 445 having an inner cylindrical collar 445a is press fitted or otherwise attached to the outer side wall 412 above the flange 412a.

The use of cold forming operation in crimping over the lower end portion 120a of the stepped inner side wall 120 against the recessed edge portion 413 around the central opening 407 of the base 406 and the annular crimp-formed joint between the base 406 and the cylindrical outer side wall 412 greatly facilitates the rapid assembly of the air bag inflator 400 and allows the use of relatively lower cost sheet material of aluminum or steel instead of more expensive cast or forged structures.

Figure 9:
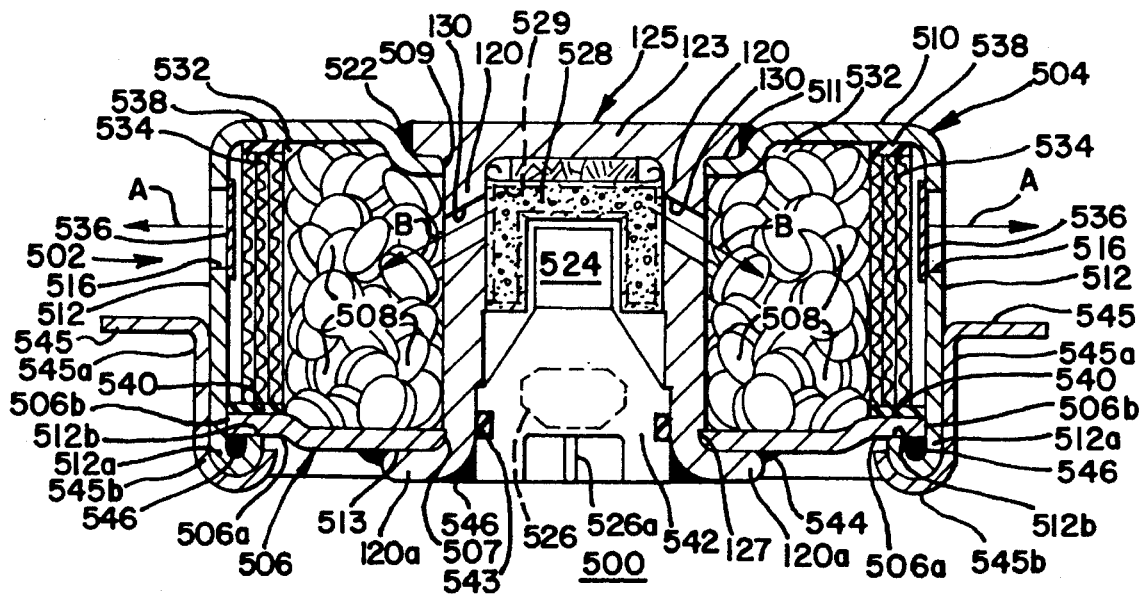
FIG. 9 is a diametrical cross-sectional view of a fifth embodiment of a new and improved air bag inflator and housing constructed in accordance with the features of the present invention in a fully assembled condition.

Referring now more particularly to FIG. 9, therein is illustrated a fifth embodiment of a new and improved air bag inflator for rapidly inflating an air bag constructed in accordance with the features of the present invention and referred to generally by the reference numeral 500. The inflator 500 includes a housing or canister 502 formed of strong, lightweight metal such as aluminum or steel, sheet or plate material having an upper, inverted cup-shaped diffuser cover 504 and a generally circular, annular base or bottom wall 506 having a central opening 507 formed thereon and joined to form a sealed enclosure or housing for containing a quantity of solid, gas generant material 508 in the form of pellets or wafers which rapidly combust to provide a necessary volume of inflation gas for the rapid deployment of an air bag in communication with the inflator 500.

The diffuser cover 504 includes an annular top wall 510 and an integrally formed, downwardly depending, cylindrical outer side wall 512. The cylindrical outer wall 512 and the annular circular top wall 510 may be formed of sheet aluminum or steel in a spin-forming or deep draw operation, and the outer side wall 512 is provided with a plurality of gas discharge diffuser ports 516 arranged in a ring around the periphery for directing the gas generated in the housing 502 to flow radially outwardly into an air bag (not shown) as indicated by the radially extending arrows A. The annular top wall 510 is formed with a circular opening 509 at the center in coaxial alignment with the central opening 507 in the annular base 506. The top wall 510 is formed with an annular, downwardly depressed shoulder 511 at a level below the upper surface of an outer portion of the top wall extending radially outwardly thereof and immediately encircling the central opening 509.

In accordance with the present invention, the inflator 500 also includes a centrally disposed, cylindrical inner side wall 120 in coaxial alignment with the outer side wall 512. A rivet-like ignition housing member 125 (FIG. 11) fabricated of metal in a forging, deep drawing, or stamping operation includes a circular upper end wall 123 integrally joining the depending inner side wall 120 and closing off the upper end of a central ignition chamber 524 provided in the housing 502. The circular upper end wall 123 extends radially outwardly of the central opening 509 a short distance and is sealed with the shoulder surface 511 of the top wall 510 by an annular weld 522, a hermetic seal ring, gasket, or other sealing and joining method. The outer upper surfaces of the top wall 510 and the upper end wall 123 of the rivet-like housing member 125 are substantially aligned as shown to provide a flat overall upper surface for the housing 502. The ignition chamber 524 contains an electrically activated ignition squib 526 and a charge 528 of an ignition-enhancing material contained within an igniter cup 529 positioned in the upper end portion of the chamber. The ignition squib 526 is electrically activated and includes a pair of downwardly depending electrical terminals 526a adapted for connection to an external electrical activation system of a motor vehicle.

The inner side wall 120 is formed with a plurality of ignition ports 130 in direct communication between the ignition chamber 524 and an outer, surrounding, annular, combination combustion and filter-containing chamber 532. The gas generant material 508 is arranged in an annular mass in an inner portion of the chamber 532 and is encircled by an outer, annular gas filter 534 mounted adjacent the inside surface of the outer side wall 512. The ignition chamber wall ports 130 direct hot combustion products from the ignition squib 526 and the ignition enhancing material 528 into the annulus of gas generant pellets 508 as indicated by the arrows B.

A variety of different types of annular gas filters 534 may be utilized; and in general, the filter includes a large area, cylindrically-shaped, inner face or inlet side, for receiving hot combustion products generated in the housing 502 and an outer surface in facing confrontation with the diffuser discharge ports 516 in the ported outer side wall 512. The diffuser wall ports 516 are sealed off against the entry of outside contaminants during the life of the inflator 500 before activation by means of a thin adhesively secured, sealing tape 536, which tape is readily ruptured by gas pressure when activation of the inflator 500 to fill an associated air bag takes place. Upper and lower annular end surfaces of the filter 534 are sealed against the underside of the top wall 510 and the upper surface of the base wall 506, respectively, by a pair of resilient, annular, sealing ring gaskets 538 and 540 in order to prevent blow-by of the hot gases around the upper and lower annular end faces of the gas filter 534. The sealing rings 538 and 540 ensure good filtering action by containing the gas flow within the available flow cross-section of the gas filter 534 until the gas exits the outer face to reach the diffuser wall gas discharge ports 516. Sealing ring 540 or an optional seal ring 546 provide a hermetic seal between the base 506 and outer side wall 512a.

Referring now to FIGS. 9 and 11, in accordance with an important feature of the present invention, a thin wall segment at a lower end portion 120a of the cylindrical inner side wall 120 initially projects downwardly below the underside of the annular base 506 and is adapted to be crimp-formed over and radially outwardly toward an adjacent annular surface 513 on the underside surface of the base around the central opening 507.

An annular step or shoulder 127 is formed at the juncture of a relatively thick upper wall portion of the inner side wall 120 and the relatively thin wall lower end portion 120a. The annular step 127 acts as a stop to support the central portion 513 of the base 506 around the opening 507 as the thin wall segment 120a is crimp-formed over radially outwardly as described in several embodiments heretofore toward the closed position as shown, to complete the sealing or closing of the housing 502 around the lower end of the rivet-like central ignition housing member 125.

An adapter plug 542, preferably formed of metal holds and supports the electrically activated ignition squib 526 and the plug is seated in place to close the lower end of the ignition chamber 524 after the cup 529 of ignition enhancing material 228 has first been inserted. An "O" ring 543 may be provided to seal between the body of the adapter plug 542 and the inside surface of the inner side wall 120 of the rivet-like housing member 125, and then the adapter body may be press-fitted into place as shown. The adapter plug 542 may also be secured to the base wall 506 by an annular weld 544. An annular weld 546, seal ring or a gasket may be located between the inner side wall portion 120a and the base wall 506 to provide a hermetic seal.

At a lower end, the outer side wall 512 is formed with a crimp-formed flange 512a turned radially inwardly and then extended upwardly to terminate in an end face 506b bearing against the underside of an upwardly deformed or offset, marginal outer edge portion 506a of the base 506 to provide a structural closure. An outer peripheral edge 506b of the base 506 bears against and supports an inside surface of the outer side wall 512 as the flange portion 512a is formed. This arrangement results in an extremely strong crimp-formed joint around the lower outer peripheral corner of the housing 502 that is well able to withstand high internal pressures.

A radially extending, annular mounting flange 545 having an inner cylindrical collar 545a is fitted onto the outer side wall 512 and the collar has a radially inwardly and upwardly extending, pre-formed flange 545b which fits around the underside of the outer side wall flange 512a as shown.

The use of cold forming operation in crimping over the lower end portion 120a of the stepped inner side wall 120 against the edge portion 513 around the central opening 507 of the base 506 and the multiple thickness annular joint around the outer edge 506a of the base 506 provides exceptional strength and facilitates the rapid assembly of the air bag inflator 500 and allows the use of relatively lower cost sheet material of aluminum or steel instead of more expensive cast or forged structures.

Figure 10:
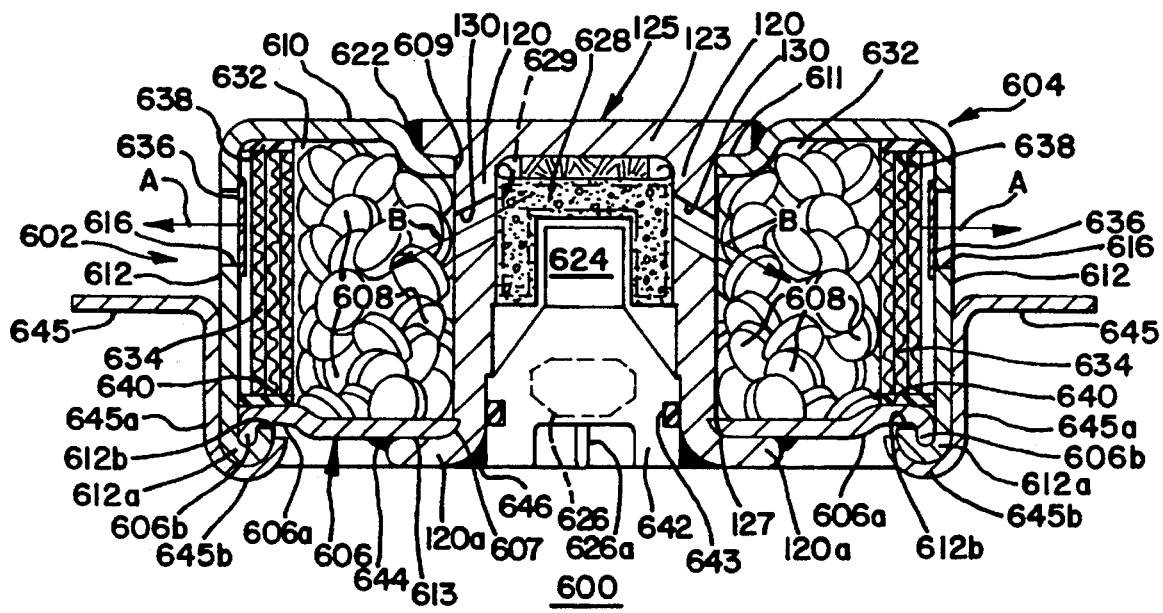
FIG. 10 is a diametrical cross-sectional view of a sixth embodiment of a new and improved air bag inflator and housing in accordance with the features of the present invention in a fully assembled condition.

Referring now more particularly to FIG. 10, therein is illustrated a sixth embodiment of a new and improved air bag inflator for rapidly inflating an air bag constructed in accordance with the features of the present invention and referred to generally by the reference numeral 600. The inflator 600 includes a housing or canister 602 formed of strong, lightweight metal such as aluminum or steel, sheet or plate material having an upper, inverted cup-shaped diffuser cover 604 and a generally circular, annular base or bottom wall 606 having a central opening 607 formed thereon and joined to form a sealed enclosure or housing for containing a quantity of solid, gas generant material 608 in the form of pellets or wafers which rapidly combust to provide a necessary volume of inflation gas for the rapid deployment of an air bag in communication with the inflator 600.

The diffuser cover 604 includes an annular top wall 610 and an integrally formed, downwardly depending, cylindrical outer side wall 612. The cylindrical outer wall 612 and the annular circular top wall 610 may be formed of sheet aluminum or steel in a spin-forming or deep draw operation, and the outer side wall 612 is provided with a plurality of gas discharge diffuser ports 616 arranged in a ring around the periphery for directing the gas generated in the housing 602 to flow radially outwardly into an air bag (not shown) as indicated by the radially extending arrows A. The annular top wall 610 is formed with a circular opening 609 at the center in coaxial alignment with the central opening 607 in the annular base 606. The top wall 610 is formed with an annular, downwardly depressed shoulder 611 at a level below the upper surface of an outer portion of the top wall extending radially outwardly thereof and immediately encircling the central opening 609.

In accordance with the present invention, the inflator 600 also includes a centrally disposed, cylindrical inner side wall 120 in coaxial alignment with the outer side wall 612. A rivet-like ignition housing member 125 (FIG. 11) fabricated of metal in a forging, deep drawing, or stamping operation includes a circular upper end wall 123 integrally joining the depending inner side wall 120 and closing off the upper end of a central ignition chamber 624 provided in the housing 602. The circular upper end wall 123 extends radially outwardly of the central opening 609 a short distance and is sealed with the shoulder surface 611 of the top wall 610 by an annular weld 622, a hermetic seal ring, gasket, or other sealing and joining method. The outer upper surfaces of the top wall 610 and the upper end wall 123 of the rivet-like housing member 125 are substantially aligned as shown to provide a flat overall upper surface for the housing 602. The ignition chamber 624 contains an electrically activated ignition squib 626 and a charge 628 of an ignition-enhancing material contained within an igniter cup 629 positioned in the upper end portion of the chamber. The ignition squib 626 is electrically activated and includes a pair of downwardly depending electrical terminals 626a adapted for connection to an external electrical activation system of a motor vehicle.

The inner side wall 120 is formed with a plurality of ignition ports 130 in direct communication between the ignition chamber 624 and an outer, surrounding, annular, combination combustion and filter-containing chamber 632. The gas generant material 608 is arranged in an annular mass in an inner portion of the chamber 632 and is encircled by an outer, annular gas filter 634 mounted adjacent the inside surface of the outer side wall 612. The ignition chamber wall ports 130 direct hot combustion products from the ignition squib 626 and the ignition enhancing material 628 into the annulus of gas generant pellets 608 as indicated by the arrows B.

A variety of different types of annular gas filters 634 may be utilized; and in general, the filter includes a large area, cylindrically-shaped, inner face or inlet side, for receiving hot combustion products generated in the housing 602 and an outer surface in facing confrontation with the diffuser discharge ports 616 in the ported outer side wall 612. The diffuser wall ports 616 are sealed off against the entry of outside contaminants during the life of the inflator 600 before activation by means of a thin adhesively secured, sealing tape 636, which tape is readily ruptured by gas pressure when activation of the inflator 600 to fill an associated air bag takes place. Upper and lower annular end surfaces of the filter 634 are sealed against the underside of the top wall 610 and the upper surface of the base wall 606, respectively, by a pair of resilient, annular, sealing ring gaskets 638 and 640 in order to prevent blow-by of the hot gases around the upper and lower annular end faces of the gas filter 634. The sealing rings 638 and 640 ensure good filtering action by containing the gas flow within the available flow cross-section of the gas filter 634 until the gas exits the outer face to reach the diffuser wall gas discharge ports 616.

Referring now to FIGS. 10 and 11, in accordance with an important feature of the present invention, a thin wall segment at a lower end portion 120a of the cylindrical inner side wall 120 initially projects downwardly below the underside of the annular base 606 and is adapted to be crimp-formed over and radially outwardly as previously described toward an adjacent annular surface 613 on the underside surface of the base 606 around the central opening 607.

An annular step or shoulder 127 is formed at the juncture of a relatively thick upper wall portion of the inner side wall 120 and the relatively thin wall lower end portion 120a. The annular step 127 acts as a stop to support the surface portion 613 of the base 606 as the thin wall segment 120a is crimp-formed over radially outwardly toward the closing position to complete the sealing or closing of the housing 602 around the lower end of the rivet-like central ignition housing member 125.

An adapter plug 642, preferably formed of metal holds and supports the electrically activated ignition squib 626 and the plug is seated in place to close the lower end of the ignition chamber 624 after the cup 629 of ignition enhancing material 628 has first been inserted. An "O" ring 643 may be provided to seal between the body of the adapter plug 642 and the inside surface of the inner side wall 120 of the rivet-like housing member 125, and then the adapter body may be press-fitted into place as shown. The adapter 642 may also be secured to the base wall 606 by an annular weld 646. An annular weld 644 may be provided to seal the wall 120a and the base 606 inside the opening 613. An annular weld 646, a seal ring or a gasket may be located between the inner side wall portion 120a and the base wall 606 to provide a hermetic seal.

At a lower end, the outer side wall 612 is formed with a narrow, radially inwardly turned and upwardly extending end flange or lip 612a for securing a short, downturned lip 606b on an outer edge portion 606a of the base 606 to provide a structural closure. An upper end 612b of the upturned lip 612a bears against the underside of the base 106 inwardly of the outer downturned lip 606b which is sandwiched between the inner surface of the outer side wall 612 and upstanding lip 612a to provide an extremely strong joint and tight seal. Alternately, a seal 640 may be provided to establish hermetic sealing of the joint area.

A radially extending, annular mounting flange 645 having an inner cylindrical collar 645a is fitted onto the outer side wall 612 and a lower end portion 645b is turned under the inwardly and upwardly turned lower end portion 612a of the outer side wall 612 to provide further strengthening.

The use of cold forming operation in crimping over the lower end portion 120a of the stepped inner side wall 120 against the surface portion 613 around the central opening 607 of the base 606 and the interfitting flange portions 606b of the base and 612a and 612b of cylindrical outer side wall 612 greatly facilitate the rapid assembly of the air bag inflator 600 and allows the use of relatively lower cost sheet material of aluminum or steel instead of more expensive cast or forged structures.

Figure 12:
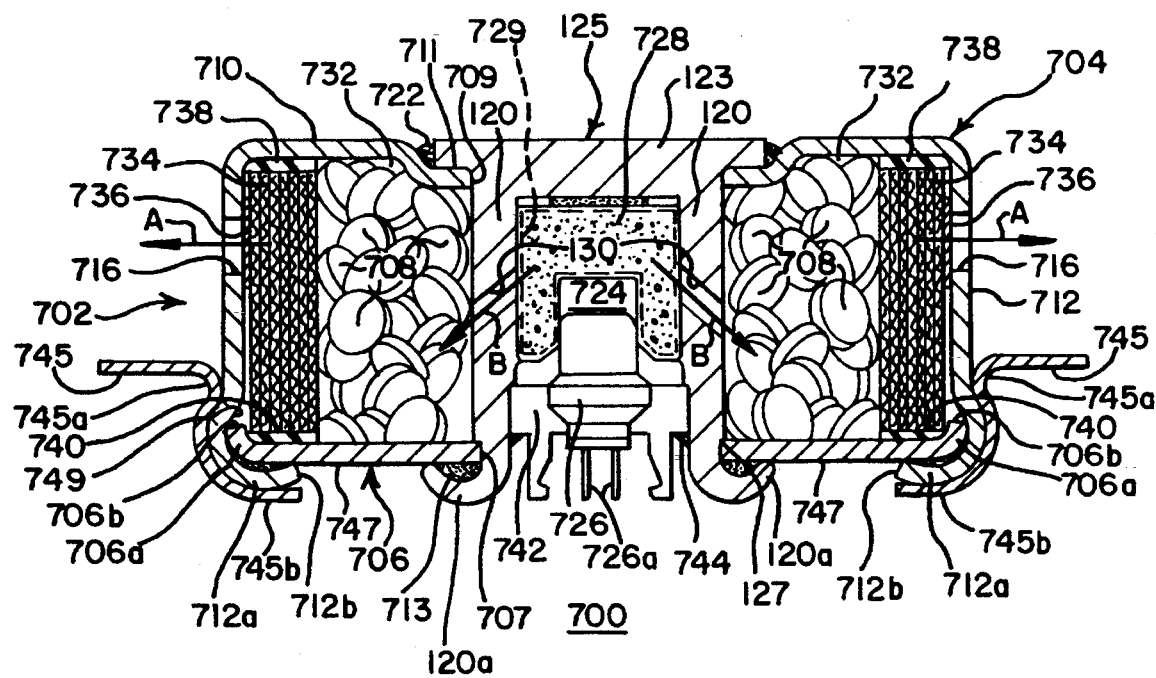
FIG. 12 is a diametrical cross-sectional view of a seventh embodiment of a new and improved air bag inflator and housing constructed in accordance with the features of the present invention in a fully assembled condition.

Referring now more particularly to FIG. 12, therein is illustrated a seventh embodiment of a new and improved air bag inflator for rapidly inflating an air bag constructed in accordance with the features of the present invention and referred to generally by the reference numeral 700. The inflator 700 includes a housing or canister 702 formed of strong, lightweight metal such as aluminum or steel, sheet or plate material having an upper, inverted cup-shaped diffuser cover 704 and a generally circular, annular base or bottom wall 706 having a central opening 707 formed thereon and joined to form a sealed enclosure or housing for containing a quantity of solid, gas generant material 708 in the form of pellets or wafers which rapidly combust to provide a necessary volume of inflation gas for the rapid deployment of an air bag in communication with the inflator 700.

The diffuser cover 704 includes an annular top wall 710 and an integrally formed, downwardly depending, cylindrical outer side wall 712. The cylindrical outer wall 712 and the annular circular top wall 710 may be formed of sheet aluminum or steel in a spin-forming or deep draw operation, and the outer side wall 712 is provided with a plurality of gas discharge diffuser ports 716 arranged in a ring around the periphery for directing the gas generated in the housing 702 to flow radially outwardly into an air bag (not shown) as indicated by the radially extending arrows A. The annular top wall 710 is formed with a circular opening 709 at the center in coaxial alignment with the central opening 707 in the annular base 706. The top wall 710 is formed with an annular, downwardly depressed shoulder 711 at a level below the upper surface of an outer portion of the top wall extending radially outwardly thereof and immediately encircling the central opening 709.

In accordance with the present invention, the inflator 700 also includes a centrally disposed, cylindrical inner side wall 120 in coaxial alignment with the outer side wall 712. A rivet-like ignition housing member 125 (FIG. 11) fabricated of metal in a forging, deep drawing, or stamping operation includes a circular upper end wall 123 integrally joining the depending inner side wall 120 and closing off the upper end of a central ignition chamber 724 provided in the housing 702. The circular upper end wall 123 extends radially outwardly of the central opening 709 a short distance and is sealed with the shoulder surface 711 of the top wall 710 by an annular weld 722, a hermetic seal ring, gasket, or other sealing and joining method. The outer upper surfaces of the top wall 710 and the upper end wall 123 of the rivet-like housing member 125 are substantially aligned as shown to provide a flat overall upper surface for the housing 702. The ignition chamber 724 contains an electrically activated ignition squib 726 and a charge 728 of an ignition-enhancing material contained within an igniter cup 729 positioned in the upper end portion of the chamber. The ignition squib 726 is electrically activated and includes a pair of downwardly depending electrical terminals 726a adapted for connection to an external electrical activation system of a motor vehicle.

The inner side wall 120 is formed with a plurality of ignition ports 130 in direct communication between the ignition chamber 724 and an outer, surrounding, annular, combination combustion and filter-containing chamber 732. The gas generant material 708 is arranged in an annular mass in an inner portion of the chamber 732 and is encircled by an outer, annular gas filter 734 mounted adjacent the inside surface of the outer side wall 712. The ignition chamber wall ports 130 direct hot combustion products from the ignition squib 726 and the ignition enhancing material 728 into the annulus of gas generant pellets 708 as indicated by the arrows B.

A variety of different types of annular gas filters 734 may be utilized; and in general, the filter includes a large area, cylindrically-shaped, inner face or inlet side, for receiving hot combustion products generated in the housing 702 and an outer surface in facing confrontation with the diffuser discharge ports 716 in the ported outer side wall 712. The diffuser wall ports 716 are sealed off against the entry of outside contaminants during the life of the inflator 700 before activation by means of a thin adhesively secured, sealing tape 736, which tape is readily ruptured by gas pressure when activation of the inflator 700 to fill an associated air bag takes place. Upper and lower annular end surfaces of the filter 734 are sealed against the underside of the top wall 710 and the upper surface of the base wall 706, respectively, by a pair of resilient, annular, sealing ring gaskets 738 and 740 in order to prevent blow-by of the hot gases around the upper and lower annular end faces of the gas filter 734. The sealing rings 738 and 740 ensure good filtering action by containing the gas flow within the available flow cross-section of the gas filter 734 until the gas exits the outer face to reach the diffuser wall gas discharge ports 716.

Referring now to FIGS. 11 and 12, in accordance with an important feature of the present invention, a thin wall segment at a lower end portion 120a of the cylindrical inner side wall 120 initially projects downwardly below the underside of the annular base 706 and is adapted to be crimp-formed over and radially outwardly toward an adjacent annular surface 713 on the underside surface of the base around the central opening 707.

An annular step or shoulder 127 is formed at the juncture of a relatively thick upper wall portion of the inner side wall 120 and the relatively thin wall lower end portion 120a. The annular step 127 acts as a stop to support the surface portion 713 of the base 706 as the thin wall segment 120a is crimp-formed over radially outwardly and upwardly toward the closing position of FIG. 12 against an annular sheet 747 of resilient sealing material to complete the sealing or closing of the housing 702 around the lower end of the rivet-like central ignition housing member 125 and between an outer side wall portion 712b of the outer side wall 710 and the base 706.

An adapter plug 742, preferably formed of metal holds and supports the electrically activated ignition squib 726 and the plug is seated in place to close the lower end of the ignition chamber 724 after the cup 729 of ignition enhancing material 728 has first been inserted. The adapter plug 742 has a body surface closely adjacent the inside surface of the inner side wall 120 of the rivet-like housing member 125, and may be press-fitted into place as shown. The adapter 742 may also be secured by an annular weld 744 to the inner surface of the inner surface of the inner side wall 120 to provide a hermetic seal.

In accordance with the invention, a pre-formed lower end portion 712a of the outer side wall 712 is formed to provide a curved stop portion 749 sloping radially outwardly and downwardly and thereafter during assembly, the outer side wall 712 is crimp-formed radially inwardly establishing the flange portion 712b below the base 706. The outwardly extending stepped portion of the lower outer wall portion 712a forms an internal annular shoulder or stop surface 749 for supportively engaging an upper end 706b of an upturned lip 706b provided at the outer edge 706a of the base 706. This supportive engagement prevents upward movement of the base 706 during the final assembly crimp-forming operation directing the lower end flange 712b radially inwardly and upwardly toward the sealing sheet 747 and the base 706.

A radially extending, annular mounting flange 745 having an inner cylindrical collar 745a is fitted onto the outer side wall 712. The collar 745a is deformed radially inwardly to match the shape of the outer side wall 712 and the lower end portion 712a to provide further strength for the lower outer edge of the housing 702.

The use of a cold forming operation in crimping over the lower end portion 120a of the stepped inner side wall 120 against the portion 713 around the central opening 707 of the base 706 and the multi-layer crimped joint at the lower end 712a of the outer side wall 712 and the supportive engagement with the base 706a and mounting flange portions 745a and 745b greatly facilitates the rapid assembly of the air bag inflator 700 and allows the use of relatively lower cost sheet material of aluminum or steel instead of more expensive cast or forged structures.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An air bag inflator including a housing formed of stamped sheet metal, comprising:

an annular base having a central opening;

a cover for containing gas generating pyrotechnic material including an annular top wall spaced from said base having a central opening in coaxial alignment with said central opening of said base and a cylindrical, ported, outer side wall integrally formed around a periphery of said top wall extending downwardly thereof having a lower edge secured with a portion of said base outwardly of said central opening; and a hollow, igniter-containing, rivet including an upper end wall closing over said central opening of said top wall and having a tubular, ported, side wall integrally formed with said upper end wall extending downwardly through said central openings of said base and said top wall, said tubular side wall having a lower end portion of reduced wall thickness below an upper surface of said base around said central opening forming an outer annular shoulder supportively engaging said base, with said lower end portion being deformed radially outwardly to engage an underside of said base.

2. The air bag inflator of claim 1, wherein:

said rivet includes an upper end flange extending radially outwardly from said tubular side wall having an underside facing an upper surface portion of said top wall around said central opening.

3. The air bag inflator of claim 2, wherein:

said upper surface portion of said top wall around said central opening is depressed downwardly from an outer upper surface portion of said top wall radially outwardly to accommodate said upper end flange of said rivet.

4. The air bag inflator of claim 1, wherein:

said annular base includes an inner portion around said central opening depressed upwardly from an outer lower surface portion radially outwardly thereof to accommodate the reduced wall thickness lower end portion of said tubular side wall when deformed radially outwardly to face said depressed inner portion of said base.

5. The air bag inflator of claim 1, including:

annular hermetic seals between upper and lower ends of said rivet around said central openings of said annular base and said top wall.

6. A housing for an air bag inflator formed of stamped sheet metal, comprising:

a cover for containing gas generating pyrotechnic material including an annular top wall having a central opening and a cylindrical, ported, outer side wall integrally formed around a periphery of said top wall extending downwardly thereof;

an annular base spaced from said top wall having a central opening in coaxial alignment with said central opening of said top wall and having an outer portion projecting upwardly to engage an outer surface on a lower edge portion of said side wall; and a hollow, igniter-containing, rivet including an upper end wall closing over said central opening of said top wall and having a tubular, ported, side wall integrally formed with said upper end wall extending downwardly through said central openings of said base and said top wall, said tubular side wall having a lower end portion of reduced wall thickness below an upper surface of said base around said central opening forming an outer annular shoulder supportively engaging said base, with said lower end portion being deformed radially outwardly to engage an underside of said base.

7. The housing of claim 6, wherein:

said outer upwardly projecting portion of said base is integrally joined with an annular mounting flange projecting radially outwardly of said outer side wall.

8. The housing of claim 7, wherein:

said annular mounting flange is formed with a peripheral edge portion at an outer edge generally normal thereto.

9. The housing of claim 8, wherein:

said outer upwardly projecting portion and said peripheral edge portion comprise concentric cylindrical segments.

10. The housing of claim 9, wherein:

said cylindrical segments extend between an upper level of said mounting flange and a lower level of said base.

11. The housing of claim 6, wherein:

said outer upwardly projecting portion of said base is welded to said lower edge portion of said outer side wall.

12. The housing of claim 6, wherein:

said outer upwardly projecting portion of said base is laser welded to said lower edge portion of said outer side wall.

13. A housing for an air bag inflator formed of stamped sheet metal, comprising:

a cover for containing gas generating pyrotechnic material including an annular top wall having a central opening and a cylindrical, ported, outer side wall integrally formed around a periphery of said top wall extending downwardly thereof and having a lower edge flange deformed to extend radially outwardly;

an annular base spaced from said top wall having a central opening in coaxial alignment with said central opening of said top wall and an upper surface supportively engaging said lower edge flange of said side wall; and a hollow, igniter-containing, rivet including an upper end wall closing over said central opening of said top wall and having a tubular, ported, side wall integrally formed with said upper end wall extending downwardly through said central openings of said base and said top wall, said tubular side wall having a lower end portion of reduced wall thickness below an upper surface of said base around said central opening forming an outer annular shoulder supportively engaging said base, with said lower end portion being deformed radially outwardly to engage an underside of said base.

14. The housing of claim 13, wherein:

said lower edge flange of said side wall and an outer edge portion of said base are joined by an annular weld.

15. The housing of claim 14, including:

a mounting flange for said housing extending radially outwardly of said outer side wall.

16. The housing of claim 15, wherein:

said mounting flange is positioned at a level above said lower edge flange of said outer side wall.

17. The housing of claim 16, wherein:

said mounting flange includes an integral inner collar joined around said outer side wall extending upwardly of said lower edge flange.

18. A housing for an air bag inflator formed of stamped sheet metal, comprising:

a cover for containing gas generating pyrotechnic material including an annular top wall having a central opening and a cylindrical, ported, outer side wall integrally formed around a periphery of said top wall extending downwardly thereof and having a lower end flange deformed to extend radially outwardly;

an annular base spaced from said top wall having a central opening in coaxial alignment with said central opening of said top wall and having an outer edge portion formed with an upwardly and radially inwardly directed flange engaging said lower end flange of said side wall; and a hollow, igniter-containing, rivet including an upper end wall closing over said central opening of said top wall and having a tubular, ported, side wall integrally formed with said upper end wall extending downwardly through said central openings of said base and said top wall, said tubular side wall having a lower end portion of reduced wall thickness below an upper surface of said base around said central opening forming an outer annular shoulder supportively engaging said base, with said lower end portion being deformed radially outwardly to engage an underside of said base.

19. The housing of claim 18, wherein:

said lower end flange has a lower surface engaging an upper surface of said base and an upper surface engaging said inwardly directed flange thereof.

20. The housing of claim 19, wherein:

said lower end flange of said outer side wall is sandwiched between upper and lower segments of said base.

21. The housing of claim 20, wherein:

said lower end flange of said outer side wall includes an outer peripheral edge covered by an upwardly directed segment of said flange of said base.

22. The housing of claim 18, including a mounting flange for said housing extending radially outwardly of said outer side wall above said upwardly and radially inwardly directed flange of said base.

23. A housing for an air bag inflator formed of stamped sheet metal, comprising:

an annular base having a central opening;

a cover for containing gas generating pyrotechnic material including an annular top wall spaced from said base and having a central opening in coaxial alignment with said central opening of said base and a cylindrical, ported, outer side wall integrally formed around a periphery of said top wall extending downwardly thereof having a lower edge portion formed to provide a radially inwardly directed end flange with an upper surface thereof engaging an underside of said base outwardly of said central opening;

a hollow, igniter-containing, rivet including an upper end wall closing over said central opening of said top wall and having a tubular, ported, side wall integrally formed with said upper end wall extending downwardly through said central openings of said base and said top wall, said tubular side wall having a lower end portion of reduced wall thickness below an upper surface of said base around said central opening forming an outer annular shoulder supportively engaging said base, with said lower end portion being deformed radially outwardly to engage said underside of said base.

24. The housing of claim 23, wherein:

said base has an upwardly extending annular groove formed in a lower surface thereof spaced inwardly of an outer peripheral edge; and said radially inwardly directed end flange of said outer side wall extends into said groove.

25. The housing of claim 24, wherein:

said base has an annular lower surface radially outwardly of said groove facing an upper surface of said radially inwardly directed end flange of said outer side wall.

26. The housing of claim 25, wherein:

said annular lower surface of said base slopes upwardly and radially outwardly of said groove in said base.

27. The housing of claim 24, wherein:

said radially inwardly directed end flange of said outer side wall has an inner edge terminating in said groove of said base.

28. A housing for an air bag inflator formed of stamped sheet metal, comprising:

a cover for containing gas generating pyrotechnic material including an annular top wall having a central opening and a cylindrical, ported, outer side wall integrally formed around a periphery of said top wall extending downwardly thereof and having a lower end portion formed with an inwardly and upwardly extending flange;

an annular base spaced from said top wall having a central opening in coaxial alignment with said central opening of said top wall and having an outer edge portion engaged on an underside thereof by an edge surface of said flange of said outer side wall outwardly of said central opening; and a hollow, igniter-containing, rivet including an upper end wall closing over said central opening of said top wall and having a tubular, ported, side wall integrally formed with said upper end wall extending downwardly through said central openings of said base and said top wall, said tubular side wall having a lower end portion of reduced wall thickness below an upper surface of said base around said central opening forming an outer annular shoulder supportively engaging said base, with said lower end portion being deformed radially outwardly to engage an underside of said base.

29. The housing of claim 28, wherein:

said lower end portion of said outer side wall includes an upwardly opening annular recess adjacent an inside surface of said outer side wall.

30. The housing of claim 29, wherein:

said annular base includes an annular downturned flange around an outer periphery extending downwardly into said annular recess.

31. The housing of claim 30, wherein:

said annular base has an outer edge forming a lower edge of said downturned flange.

32. The housing of claim 29, wherein:

said annular base includes an outer peripheral edge engaging an inside surface of said outer side wall.

33. An air bag inflator having a housing formed of stamped sheet metal, comprising:

a cover for containing gas generating pyrotechnic material including an annular top wall having a central opening and a cylindrical, ported, outer side wall integrally formed around a periphery of said top wall extending downwardly thereof, said side wall including a lower end portion deformed radially outwardly and inwardly providing an internal groove projecting radially outwardly relative to an upper inside surface portion of said side wall forming an annular stop surface facing downwardly;

an annular base spaced from said top wall having a central opening in coaxial alignment with said central opening of said top wall, said base having an outer peripheral edge portion engaging said annular stop surface, said base having an underside engaged by said lower end portion of said side wall inwardly of said groove; and a hollow, igniter-containing, rivet including an upper end wall closing over said central opening of said top wall and having a tubular, ported, side wall integrally formed with said upper end wall extending downwardly through said central openings of said base and said top wall, said tubular side wall having a lower end portion of reduced wall thickness below an upper surface of said base around said central opening forming an outer annular shoulder supportively engaging said base, with said lower end portion being deformed radially outwardly to engage said underside of said base.

34. The air bag inflator of claim 33, wherein:

said outer peripheral edge portion of said annular base includes an upturned flange.

35. The air bag inflator of claim 33, including:

mounting flange means extending radially outwardly of said lower end portion of said outer side wall and secured to an outside surface thereof.

\* \* \* \* \*